UNITED STATES PATENT OFFICE.

NAPOLEON G. PETINOT, OF NEW YORK, N. Y., ASSIGNOR TO UNITED STATES ALLOYS CORPORATION, A CORPORATION OF NEW YORK.

METHOD OF MANUFACTURING IRON SULFID.

1,252,024.  Specification of Letters Patent.  Patented Jan. 1, 1918.

No Drawing.  Application filed March 7, 1917. Serial No. 153,174.

*To all whom it may concern:*

Be it known that I, NAPOLEON G. PETINOT, a citizen of the United States of America, and a resident of the city, county, and State of New York, have invented a new and useful Method of Manufacturing Iron Sulfid, of which the following is a full, clear, and exact description.

As is well known to those skilled in the art, various methods of manufacturing iron sulfid have been employed heretofore. One method was that of heating together, at a high temperature, a mixture of three parts of iron filings and two parts of sulfur in a covered crucible. Another method was to heat together, a mixture of iron disulfid and iron filings in a crucible until the whole mass was fused. Still another was that covered by United States Letters Patent No. 1,169,093, issued to me on January 18, 1916, which consists in heating, in an electric furnace, pyrites ore containing silicious or other impurities sufficient to produce a slag, and sufficient iron to form ferrous sulfid, according to the following equation:

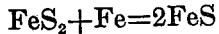

$$FeS_2 + Fe = 2FeS$$

While the last mentioned method of manufacture is better than any heretofore employed, I have found that a considerable quantity of sulfur is lost by vaporization, in spite of the protecting blanket of slag, which is formed during the working of the furnace. Moreover, the operation of the furnace is not continuous, because after the charge is fused and the chemical reaction referred to above is completed, I must tap the furnace so as to draw off the ferrous sulfid, and also the slag, and then introduce a fresh charge.

In producing my invention, I have sought to overcome the disadvantages above enumerated and to provide a process which shall be continuous.

Moreover, my method is such, that the sulfur (which is ordinarily lost) is conserved and utilized as a reducing agent, thus making the method very economical.

In carrying out my invention, I prefer to use iron pyrites with a mixture of oxid of iron in such proportions, that, when the mixture is fused, reaction occurs between its constituents. This reaction is represented by any one of the following equations:

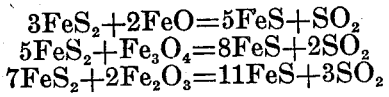

$$3FeS_2 + 2FeO = 5FeS + SO_2$$
$$5FeS_2 + Fe_3O_4 = 8FeS + 2SO_2$$
$$7FeS_2 + 2Fe_2O_3 = 11FeS + 3SO_2$$

The mixture is, therefore, made up so as to correspond to the reactions given above; the proportions of course depending upon the analysis of the iron oxid used for the purpose in view. The mixture is fused in an electric furnace of preferably the Siemens type.

When the mixture is fused, the reaction occurs as indicated above, and the iron sulfid (FeS) accumulates in the bottom of the crucible, while the fused mixture of pyrites and iron oxid that still remain in their unreduced condition at the top of the furnace, form a pseudo-slag. When sufficient iron sulfid has accumulated in the crucible, it is tapped without shutting down the furnace. The furnace may also be charged without stopping the process, thus making the method of manufacture a continuous one.

While it is true, as indicated by the reactions shown in the equations given above, that sulfur is lost in the form of $SO_2$, it is to be noted that this sulfur has a useful function as a reducing agent. In my present invention, this sulfur removes the oxygen from the iron oxid, whereas, in the invention of my previously mentioned patent, the sulfur is lost by vaporization and, therefore, performs no useful work.

While I have described the use of iron oxids in my process, it will be obvious to metallurgists that I may use any form of oxids, such as mill scale, which scale may contain a certain percentage of metallic iron. When such oxids are used, the mixture may be modified by introducing an excess of iron pyrites, so as to provide sufficient sulfur to combine with the iron existing in the elementary state. It should be understood, however, that one of the distinguishing features of my invention consists in the utilization of a part of the sulfur of the iron pyrites as a reducing agent, such sulfur combining with the oxygen of iron oxids present.

Having thus described my invention, what I claim is:

1. A method of producing iron sulfid which consists in melting together a mixture of iron pyrites and iron oxid.

2. A method of producing iron sulfid which consists in continuously charging into an electric furnace, a mixture of iron pyrites and iron oxid, and drawing off from time to time the iron sulfid, without interrupting the operation of the furnace.

3. A method of producing iron sulfid which consists in melting together a mixture of iron pyrites, metallic iron, and iron oxid, and utilizing a part of the sulfur of the pyrites as a reducing agent to combine with the oxygen of the iron oxid.

In testimony whereof, I have hereunto signed my name.

NAPOLEON G. PETINOT.